July 6, 1965 M. H. BLAND ETAL 3,193,705
POWER SUPPLY TRANSFER CIRCUIT
Filed May 4, 1962
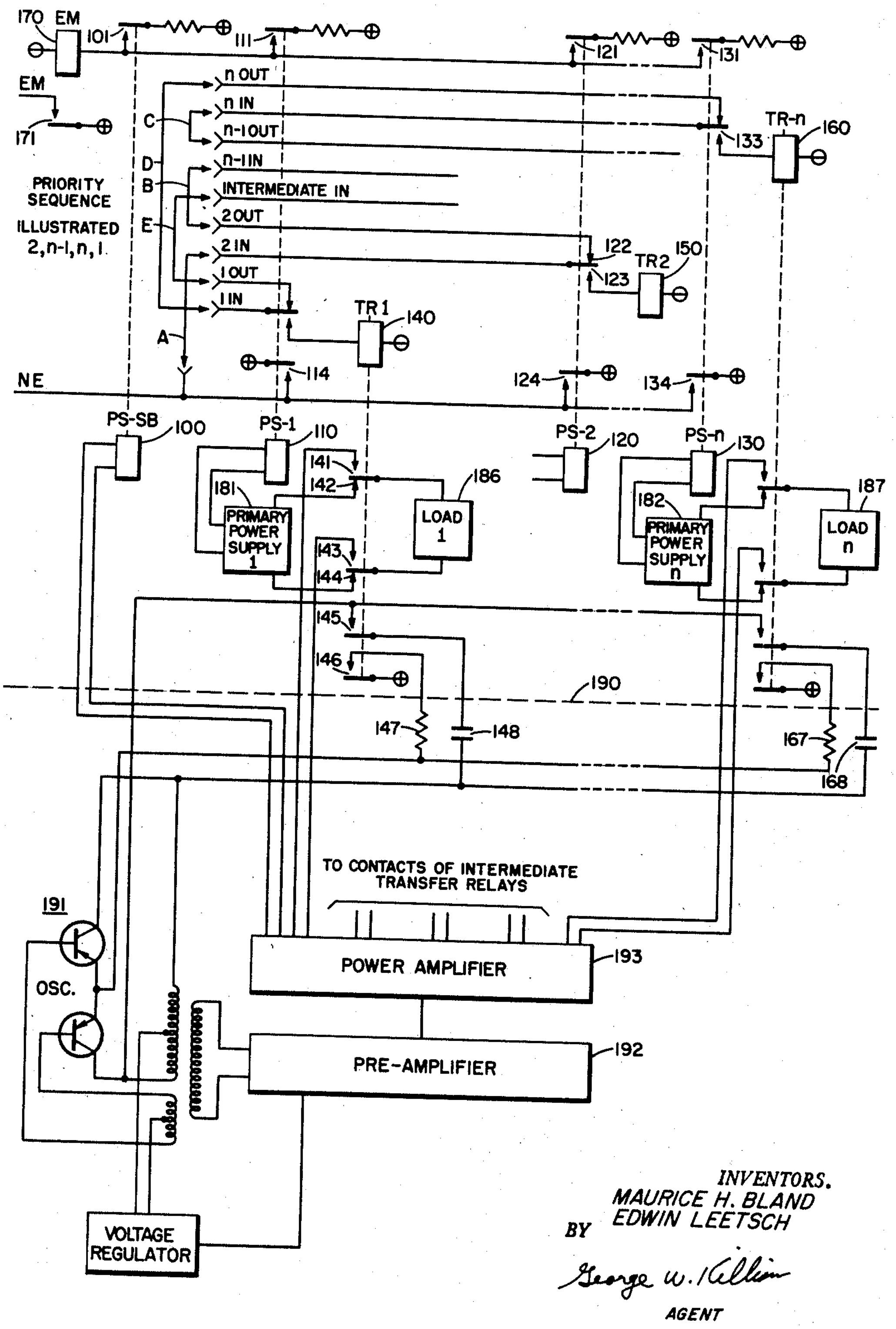
INVENTORS.
MAURICE H. BLAND
EDWIN LEETSCH
BY George W. Killian
AGENT 3,193,705
Patented July 6, 1965

3,193,705

POWER SUPPLY TRANSFER CIRCUIT

Maurice H. Bland, Fairport, and Edwin Leetsch, Rochester, N.Y., assignors to General Dynamics Corporation, Rochester, N.Y., a corporation of Delaware Filed May 4, 1962, Ser. No. 192,596
5 Claims. (Cl. 307—64)

This invention relates in general to power supply systems and more particularly, to a power supply system incorporating a plurality of individual power supplies each having individual output characteristics, a universal standby power supply, and transfer means for selectively transferring the electrical load of any one of said individual power supplies to said standby power supply.

Although the invention herein disclosed is suitable for more general application, it is particularly adapted for use in automatic telephone systems which require a plurality of separate power supplies each having different output characteristics for use in selective signaling. In such systems, the ringers associated with the individual subscribers on a party line are each designed to respond only to a ringing signal of a different specific predetermined frequency. Accordingly, a plurality of ringing power supplies are required to selectively operate any one of the ringers. Inasmuch as any one of the individual power supplies may become faulty, or inoperative, it is necessary to provide either a standby power supply for each of the primary power supplies, or a universal standby power supply which can selectively provide any one of the plurality of different types of output signals. The former requires a plurality of standby power supplies and is, therefore, bulky and expensive; while the latter, employing a universal standby power supply, has been limited in its application because manual adjustment of the standby power supply to the desired frequency has been necessary.

It is the general object of this invention to provide a new and improved power supply system.

It is a more particular object of this invention to provide a new and improved means for automatically transferring from a failing power supply to a universal standby power supply.

It is another object of this invention to provide new and improved means for transferring a load from any one of a plurality of failing power supplies to a universal standby power supply.

It is another object of this invention to provide a new and improved means for selectively transferring a load from a selected one of two or more failing power supplies to a universal standby power supply.

It is another object of this invention to provide new and improved means for transferring the load from a failing power supply to the universal standby power supply on a priority basis when two or more power supplies fail.

It is another object of this invention to provide new and improved means for transferring the load from a failing power supply to the universal standby power supply on a priority basis when two or more power supplies fail irrespective of the sequence of failure of the power supplies.

A typical telephone system incorporating this invention employs five separate primary ringing power supplies in one of three series of frequencies, customarily referred to as the synchromonic, harmonic, or decimonic series. The frequencies range from approximately 16 to 66 cycles per second. In accordance with this invention, there is also provided a universal standby power supply that includes an oscillator which will be automatically and selectively tuned to the frequency of the one of the primary power supplies which fails. In addition, a priority circuit is provided which will cause the standby power supply to provide the output potential and frequency of a predetermined one of the failing ones of the primary power supplies if two or more of the primary power supplies should become inoperative. A priority circuit is desirable because, in a typical telephone exchange, the business lines, private lines, and other important subscribers, are served by a single ringing generator and, in the event that that particular ringing generator should fail after some other ringing generator had failed, it is desirable that the standby ringing generator power supply should shift and provide the more important ringing frequency. The prior art required that such a shift be completed manually. Additional features include standard non-emergency and emergency alarm signals.

Further objects and advantages of the invention will become apparent as the following description proceeds, and features of novelty which characterize the invention will be pointed out in particularly in the claims annexed to and forming a part of this specification.

For a better understanding of the invention, reference may be had to the accompanying drawing which shows the details of the transfer circuit incorporating the invention.

It is believed that the invention can best be understood by considering the following detailed description.

*Detailed description*

A system incorporating the invention will include a plurality of primary power supplies, such as power supplies 181 and 182, which represent the first and last power supplies, respectively, of a plurality of power supplies. These power supplies may take any of the forms suitable for the purpose desired. For use in a telephone exchange, the power supplies 181 and 182 may be of any well known and widely used types, such as A.C. or D.C. driven motor generators, or D.C. activated vibrators, or solid state devices. For operating telephone ringers, the outputs of the various power supplies, represented by 181 and 182, will range from approximately 16 to 66 cycles per second, and 90 to 140 volts, as may be required. Associated with each of the power supplies is a monitoring or detecting device 110, 120 and 130, which operates in response to the associated power supply failing to provide their respective proper output frequencies and/or potentials. The monitoring devices 110, 120 and 130 are adjusted to operate not only in response to a catastrophic failure of the associated power supply, but also in response to the output of the associated power supply varying by more than a fixed amount from the normal output. Inasmuch as the circuit details of either the power supply or the monitoring means do not form a part of this invention, and since such apparatus is well known to those skilled in the art, the circuit details of these components are not illustrated nor described herein as it is believed that such inclusion would only tend to mask or obscure the present invention.

Each of the plurality of power supplies provides electrical energy to individual electrical loads, which are indicated symbolically as loads 186 and 187 for the first and last power supplies, respectively. In an application of the invention to a telephone exchange, the loads represent subscribers' telephone ringers.

In addition to the plurality of primary power supplies, such as 181 and 182, there is provided a single standby power supply 190. The standby power supply includes an oscillator section 191 which may be selectively tuned to any of a plurality of different frequencies. The tuning is accomplished by the selective operation of one of the transfer relays 140, 150 or 160, which, in operating, connects a tuning resistor-capacitor pair, such as 147 and 148 or 167 and 168, into a resonant circuit portion of the oscillator circuit 191. The oscillator then operates at a specific predetermined one of a plurality of frequencies depending upon which resistor-capacitor pair was coupled to the resonant portion of the oscillator in the standby power supply 190. The output of the oscillator portion is coupled to a pre-amplifier section 192 and then to the power amplifier section 193 of the universal standby generator 190. The universal standby generator 190 has associated with it a monitoring device 100 corresponding to the similar devices 110, 120 and 130 associated with their respective primary power supplies. Monitoring device 100 operates in response to the failure of the standby power supply to provide output signals when it is called upon to produce output signals.

Returning now to the operation of one of the monitoring devices 110, 120 or 130 in response to the failure of the associated power supply to provide the required output potential, one of the contacts 114, 124 or 134 will be closed. The closure of any one of these contacts will place a positive terminal, hereinafter referred to as "ground" in accordance with standard telephone terminology, on the non-emergency lead designated NE. Although not illustrated, the ground on the non-emergency lead may be utilized to provide visual or audible remote alarms as may be desired.

*The priority circuit*

At any given instant the standby power supply 190 can only be tuned to a selected one of a plurality of possible output frequencies. Therefore, if two or more of the plurality of primary power supplies should fail, the standby power supply should be adjusted to the output of the most important one of the failing primary power supplies. Accordingly, the transfer circuit includes priority wiring which, by means of optional strapping, permits any desired predetermined priority sequence. In order to transfer the load 186 from primary power supply 181 to universal standby power supply 190, it is necessary to operate transfer relay 140 to open contacts 142 and 144 and to close contacts 141 and 143. The closure of contacts 145 and 146 connects the resistor-capacitor pair 147 and 148 into the oscillator circuit 191 of standby power supply 190, as previously mentioned, to tune the standby power supply to the frequency of the failing primary power supply.

The transfer relays 140, 150 and 160 are interconnected in such a manner that only one of the named relays can be energized at any one time. Relay 140 is functionally designated TR–1 (transfer number one) and, in response to the operation of this relay, the load 186 of the first power supply 181 will be transferred to the standby power supply 190. In a similar manner, the second transfer relay 150 will transfer load 2 (not shown) from power supply 2 (not shown) to the standby power supply, and the $n$th transfer relay 160 will transfer load $n$ from power supply $n$ to the standby power supply.

For each transfer relay there is an IN and OUT lead. A strap connection is made from the non-emergency lead NE lead to the IN lead of the transfer relay associated with the primary power supply whose output has the greatest priority. A strap is then connected from the OUT lead of the highest priority transfer relay to the IN lead of the next highest priority. In a similar fashion, straps are added from each OUT lead to the next succeeding priority IN lead. In the illustrated case, the strap A connects to the second transfer relay 150 and therefore the output potential of power supply 2 has the greatest priority; that is, the standby power supply will produce an output corresponding to the output of power supply 2 in preference to any other output when the second power supply fails. More specifically, if relay 120 should operate, thereby indicating a failure of power supply 2 (not shown), contacts 124 will close and forward a ground through the A strap and operated contacts 123 to operate relay 150. Relay 150 will operate contacts associated therewith, which are similar in nature and intent to contacts 141–146 on relay 140. Therefore, in response to the operation of relay 120, the resonant circuit in the oscillator of the standby power supply will be tuned to the frequency of power supply 2 (not shown), and load 2 (not shown) will be transferred to the standby power supply 190.

In order to provide an illustration of the operation of the priority circuit, let it be assumed that power supply $n$ was the first power supply to fail and that, in response thereto, load $n$ was transferred from power supply $n$ to the standby power supply and that the standby power supply was automtaically adjusted by the resistor-capacitor pair 167 and 168 to produce an output corresponding to the proper output power supply $n$. With the illustrated priority sequence, it will be noted that power supplies $n$–1 and 2 both have higher priority than power supply $n$. Therefore, if either of the aforementioned power supplies should fail, the priority circuit should readjust the standby power supply to produce the higher priority output and transfer the load of the higher priority power supply to the standby power supply. In this event, the load $n$ will be reconnected to power supply $n$ and, if power supply $n$ is producing any output, there may be at least a partial functioning of the equipment represented by load $n$. It was assumed that power supply $n$ had failed first and that subsequently transfer relay 160 had operated. The circuit to operate transfer relay 160 is from the negative power supply connected to relay 160 through the winding of relay 160 and operated contacts 133, the strap designated C, to the $n$–1 OUT lead, through normally closed contacts (not illustrated) on the PS–$n$–1 relay (not illustrated) to the $n$–1 IN lead, the B strap, the 2 OUT lead, closed contacts 122, the 2 IN lead, the A strap, and ground applied to the NE lead from contacts 134. If it is assumed that power supply 2 should fail, then relay 120 will operate, thereby closing contacts 124 and applying an alternate ground to the NE lead which will be forwarded through the A strap to the 2 IN lead and operated contacts 123 to operate the second transfer relay 150. The operation of relay 120 opened contacts 122, thereby opening the circuit to transfer relay 160. That is, since power supply 2 has the greater priority, the second transfer relay 150 is operated and the $n$th transfer relay 160 is released. The resistor-capacitor pair associated with transfer relay 2 will readjust the standby power supply 190 so that it will produce an output potential corresponding to the desired output potential of power supply 2 and the load 2 will be furnished electrical power from the standby power supply.

In the event two or more of the primary power supplies, or one of the primary power supplies and the standby power supply, should fail, an emergency situation will be created and an emergency alarm will be provided. The operation of any one of the relays 100, 110, 120 and 130 will close an obvious circuit including contacts 101, 111, 121 or 131 from ground through a resistor to the emergency relay 170. However, the resistor limits the current to such an extent that the emergency relay 170 will not be operated unless two or more of the resistors are connected in parallel by the simultaneous operation of two or more of the named relays. The operation of relay 170 will close contacts 171 to forward a ground on the EM lead to provide a visual or audible remote emergency alarm signal as may be required.

Although not shown, manual switching may be added to provide for manual transfer or testing of the transfer features.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. A system comprising a given plurality of primary power supplies each generating a tone signal of a predetermined frequency within a given tolerance, the predetermined frequency of the tone signal from at least one of said primary power supplies being different from the predetermined frequency of the tone signal of another one of said primary power supplies, separate individual loads corresponding to each of said primary power supplies, separate individual transfer switch means corresponding to each of said primary power supplies, each of said transfer switch means having a normal switching position and a transfer switching position, individual means for applying the tone signal from each primary power supply to its corresponding load only in response to its corresponding transfer switch means being in its normal switching position, failure means coupled to said plurality of primary power supplies for detecting the failure of a primary power supply to generate its tone signal of a predetermined frequency within said given tolerance and for causing said transfer switch means corresponding to a failed primary power supply to be switched from its normal position to its transfer position, and a standby power supply including an oscillator, separate normally disconnected individual frequency-determining means for said oscillator corresponding to each of said primary power supplies for causing said oscillator to generate a tone signal of the predetermined frequency of any primary power supply in response to the frequency-determining means corresponding to that primary power supply being connected to said oscillator, and means responsive to a transfer switch means being in its transfer switching position for connecting the frequency-determining means corresponding thereto to said oscillator and for connecting the output of said standby power supply to the load corresponding thereto.

2. The system defined in claim 1 wherein said oscillator is normally disabled, and further comprising enabling means responsive to a transfer switch means being in its transfer switching position for enabling said oscillator.

3. The system defined in claim 1 wherein said tone signals generated by each of said primary power supplies has a predetermined output level, and further including separate individual predetermined valued resistances corresponding to each primary power supply and means responsive to a transfer switch means being in its transfer switching position for connecting the resistance corresponding thereto to said oscillator to control the output level of said oscillator to make the output level of said standby power supply equal to the output level of that primary supply with which that transfer switch means corresponds.

4. The system defined in claim 1 wherein said plurality of primary power supplies are assigned a relative priority order, and wherein said failure means includes coupling means individual to each primary power supply connected in a chain in accordance with said priority order and responsive to the failure of more than one primary power supply for causing only the transfer switch means corresponding to the failed primary power supply having the highest priority to be switched to its transfer switching position.

5. The system defined in claim 1 wherein said failure means includes means responsive to the failure of more than one primary power supply for generating an emergency signal.

References Cited by the Examiner

UNITED STATES PATENTS

| | | | |
|---|---|---|---|
| 2,350,873 | 6/44 | Busch et al. | 179—27.3 |
| 2,694,155 | 11/54 | Bates | 307—64 |
| 3,067,411 | 12/62 | Dhimos | 340—253 XR |

NEIL C. READ, *Primary Examiner.*